Feb. 23, 1971 G. C. DRISCOLL, JR 3,566,363

PROCESSOR TO PROCESSOR COMMUNICATION IN A MULTIPROCESSOR COMPUTER SYSTEM

Filed July 11, 1968 16 Sheets-Sheet 1

ARRANGEMENT OF UNITS AND INTERCONNECTIONS

INVENTOR
GRAHAM C. DRISCOLL, JR.

BY [signature]
ATTORNEY

Feb. 23, 1971 G. C. DRISCOLL, JR 3,566,363

PROCESSOR TO PROCESSOR COMMUNICATION IN A MULTIPROCESSOR COMPUTER SYSTEM

Filed July 11, 1968 16 Sheets-Sheet 2

PROCESSOR REQUEST MECHANISM

Feb. 23, 1971 G. C. DRISCOLL, JR 3,566,363
PROCESSOR TO PROCESSOR COMMUNICATION IN A MULTIPROCESSOR COMPUTER SYSTEM
Filed July 11, 1968 16 Sheets-Sheet 13

USED TO READ IN TO
REQUEST ARRAY & M ARRAY

USED TO READ OUT
OF REQUEST ARRAY

USED TO READ IN
AND READ OUT
OF FETCH ARRAY

United States Patent Office 3,566,363
Patented Feb. 23, 1971

3,566,363

PROCESSOR TO PROCESSOR COMMUNICATION IN A MULTIPROCESSOR COMPUTER SYSTEM

Graham C. Driscoll, Jr., Yorktown Heights, N.Y., assignor to International Business Machines Corporation, Armonk, N.Y., a corporation of New York Filed July 11, 1968, Ser. No. 744,185
Int. Cl. G06f 15/16
U.S. Cl. 340—172.5 8 Claims

ABSTRACT OF THE DISCLOSURE

In a multiprocessor computer system, a mechanism is provided allowing individual processor units to communicate with each other via the existing storage bus mechanism. Hardware and controls are provided within the individual processors, the bussing mechanism and within the storage modules whereby a given processor may send a message over the storage bus to the storage module and the storage module controls will initiate communication with the indicated processor unit upon the receipt of such a message.

TABLE OF CONTENTS

| | Column |
|---|---|
| Title | 1 |
| Abstract of the Disclosure | 1 |
| Table of Contents | 1 |
| Cross References to Related Applications | 1 |
| Background of Invention | 1 |
| Summary of the Invention and Objects | 2 |
| Drawings | 4 |
| Description of the Preferred Embodiment | 4 |
| Timing Sequence Charts | 12 |
| Conclusions | 13 |
| Claims | 14 |

CROSS-REFERENCES TO RELATED APPLICATIONS

Copending application Ser. No. 607,040 of H. P. Schlaeppi, entitled, "Control Mechanism for a Multiprocessor Computing System," filed Jan. 3, 1967, and U.S. patent application Ser. No. 653,097 of G. C. Driscoll and M. Lehman, entitled, "Task Selection in a Multiprocessor Computing System," filed July 13, 1967, both disclose multiprocessor computing ssytems wherein a mechanism is provided allowing the individual processors to communicate with each other over a special interconnection bus which is dedicated to such purpose.

BACKGROUND OF THE INVENTION

Current developments in the computer industry have caused an ever increasing trend towards larger and more sophisticated electronic computers. These trends and developments have to a large extent been made possible by higher speed and less expensive circuit elements. Further increases of system throughput have come from improved organization of computing systems. A form of computer organization which is receiving ever increasing interest is that of the multiprocessor configuration wherein several autonomous processing units are provided capable of sharing a common workload.

In any such multiprocessor computing system means must be provided for controlling the application of a system's resources such as processors, storage space and input-output (I/O) devices to work on the load presented to the system by the various users. The functions which this portion of the system has to perform are often referred to as executive functions. They are determined by the operational requirements of the user community.

The methods available for implementing these functions and their efficiency depend on certain properties of the system architecture, the structure imparted by users and systems to the information manipulated, and the structure of processes the system creates in operation.

The design goal of any computer system is to achieve high overall efficiency while meeting a set of general operational objectives which may be summarized by the requirement than an individual receiver receives the full benefit from the large pool of resources and information existing in the system, so as to secure service within a time interval specified by the user (subject to capacity limitations) at the lowest possible cost.

In order to describe the present invention, certain terms should first be defined. A multi-processor is considered to be a computing system that comprises a number of autonomous processors sharing access to a common storage area and capable of executing programs concurrently. The term "job" is used to designate the entire activity that is engendered in the system by the acceptance of an individual user request for computation. A multiprocessor is capable of processing several independent jobs concurrently.

It is well known that many jobs can be dissected into sequences of instruction executions which are logically almost independent from each other. These sequences may be called "tasks." Given a job that is composed of several tasks, a multiprocessor can be made to process these concurrently. This mode of operation is normally termed "parallel processing."

The present invention represents an attempt to solve the problem of providing facilities that permit user and executive tasks running concurrently, to interact with each other where appropriate, without having to intersperse the programs with numerous test instructions for this purpose, which could be wasteful of memory space and storage cycles.

A number of prior art attempts towards the design of various sized multiprocessing systems have been made including controls which resorted to repeated polling of storage locations or relied upon functionally specialized wiring between processors for the purposes of interaction. The former solution is costly in terms of storage space and memory cycles as mentioned previously and the latter is costly in hardware and is functionally limited.

The previously referenced copending applications, both of which are assigned to International Business Machines Corporation, disclose a powerful multi-processing system utilizing a common interaction bus and individual interaction controllers associated with each processor. Each of said interaction controllers is capable of communicating with any other interaction controller over said bus. However, this solution, while considerably superior to either of the aforementioned prior art solutions, nevertheless requires considerable hardware and the special interaction bus. The solution afforded by the present invention attempts to utilize the existing storage module busses for interactive communication without conventional storage polling and further requires the addition of minimum hardware.

SUMMARY OF THE INVENTION AND OBJECTS

It has been found that improved performance in a multiprocessing system, including a plurality of individually operable processing units, a bussing mechanism for servicing said processing units and a plurality of storage modules, is possible by adding a relatively small amount of additional hardware to the processors, the bussing mechanism and the storage module controls. This hardware allows a processor to address memory for conventional store or fetch operations and also to transfer data to the memory data register from whence it may be transmitted to a recipient processor without going through a memory cycle or to cause the memory to send the contents of a specifiable memory location to a recipient processor.

By providing the above facility, the processors communicate over the existing storage busses to the existing bussing mechanism selection means and utilize one of the already existing data buffer registers in the various storage modules for the purpose of holding information until a recipient processor is able to receive same. Thus, with very little additional hardware and control circuitry a recipient processor may be addressed without extensive preprogramming of both sending and recipient processor and the need for continual monitoring by the recipient processor to see if the message for it is ready to be transmitted from the sending processor.

It is accordingly a primary object of the present invention to provide a more flexible multiprocessing system allowing for communication between the processors utilizing as much existing hardware as possible.

It is still a further object of the invention to utilize the data holding registers of the storage modules for transmitted data without going through actual memory cycles.

It is another object of the invention to allow one processor to cause a unit of data to be fetched from memory and sent to another processor.

It is yet another object of the invention to provide for such direct interaction between processors without appreciable preprogramming of the recipient processor.

It is a still further object of the invention to provide such a processor interaction system wherein a message to be transmitted between said processors looks very much like a conventional store or fetch request.

The foregoing and other objects, features and advantages of the invention will be apparent from the following more particular description of a preferred embodiment of the invention, as illustrated in the accompanying drawings.

The objects of the present invention are accomplished in general by a multiprocessor computing system including a plurality of processors and at least one storage module wherein each processor is directly connectable to said storage module over a data transmitting bus. Means are provided in each processor for specifying to the storage module data which is to be transmitted to another processor. Further means is provided in each processor for supplying an identification of the recipient processor of such transmitted data to the storage module. Means are provided in the storage module for storing said identification of the recipient processor to which a given segment of data is to be transmitted together with means for utilizing this identification to transmit the specified data, when obtained, to the identified processor. Additional means are provided in each processor for recognizing when a piece of data appearing on its bus from said storage module is directed to it and for utilizing such data.

The method of identifying the processor to which a message is to be sent according to the presently disclosed embodiment is the characteristic address of the processor itself. Thus, as far as the overall system is concerned, a message looks very much like a combination store and fetch request. However, instead of the sender's address being utilized by the storage module to return information to the processor, the recipient address is utilized. Further in the presently disclosed embodiment there is assumed in a system wherein a processor disconnects itself from the bussing mechanism subsequent to making a store, fetch or message request and when the bussing mechanism controls serve its request in the storage module, the appropriate processor is reconnected. This is believed to be the most general multiprocessing environment which is normally used in such large systems. In a situation where a requesting processor remains connected to the storage module until its information is received for normal store and fetch operations, further hardware would be of necessity be added to the system to disconnect the sending module from the storage module and subsequently allowing connection of the recipient processor. However, such modification would be well within the knowledge of a person skilled in the computer arts.

The presently disclosed multiprocessor system thus provides a highly versatile multiprocessor system wherein one processor may request service by one or more other processors within the system without the necessity of utilizing complex preprogramming of potential recipient processors and/or continuous testing of some predesignated storage location by the potential recipient processors.

Further, it accomplishes these ends with the addition of a minimum of extra control hardware within the processor, the buffering mechanism and the storage modules. Finally, existing interconnection busses, which would be found in any conventional multiprocessing system, serve the function of transmitting messages between processors with the result that much costly and complex special purpose wiring is eliminated. The latter feature is of special importance since it might be desired to modify existing systems so that only the control circuitry would have to be modified and not the actual cable interconnections.

DRAWINGS

Figures 4, 4B:
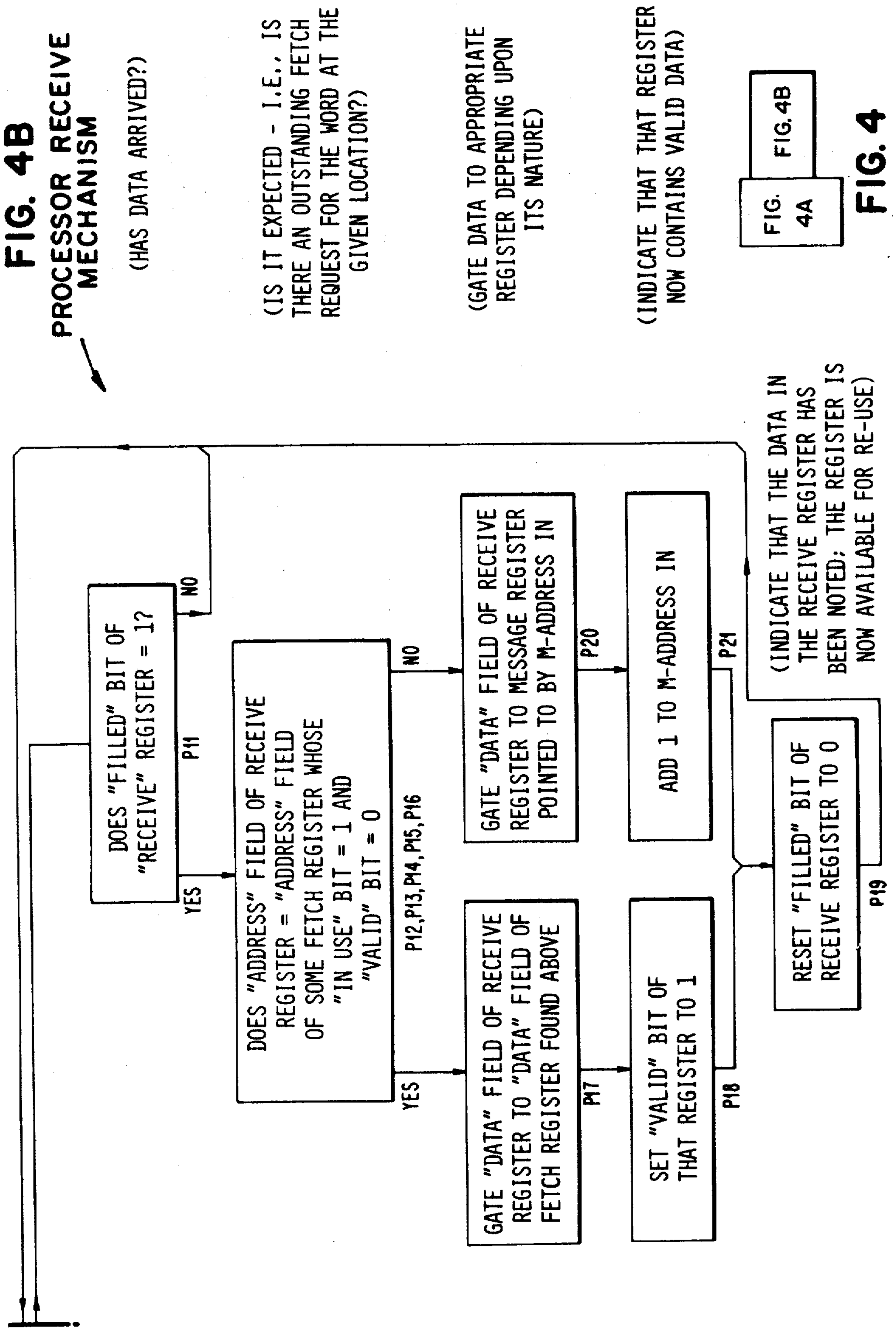
FIG. 4 is an organizational diagram for FIGS. 4A and 4B.
Figure 4A:
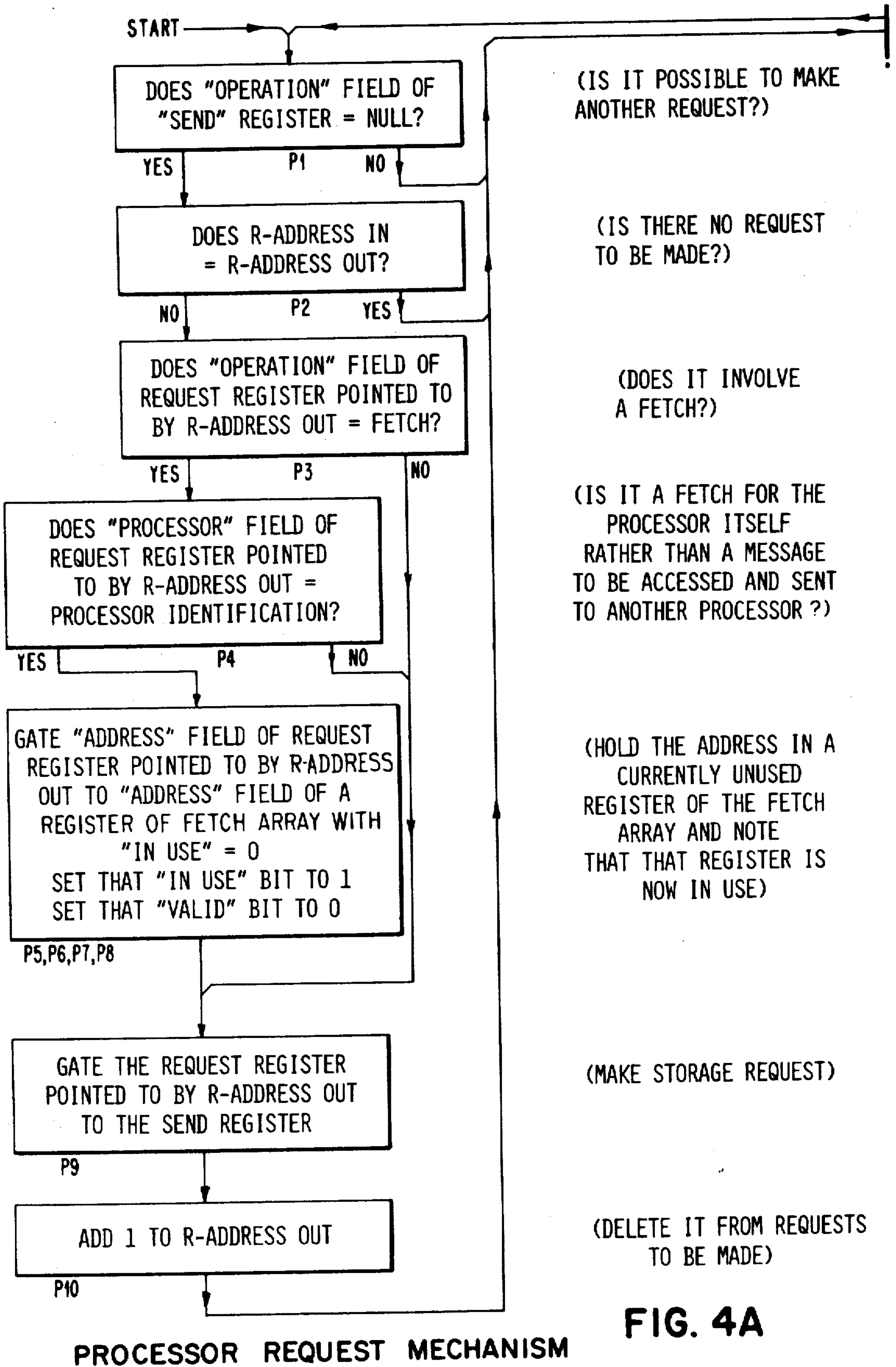

FIGS. 4A and 4B comprise a flow chart for the P-Clock which illustrates the operations occurring in the Processors during this clock sequence.

Figures 5, 5A:
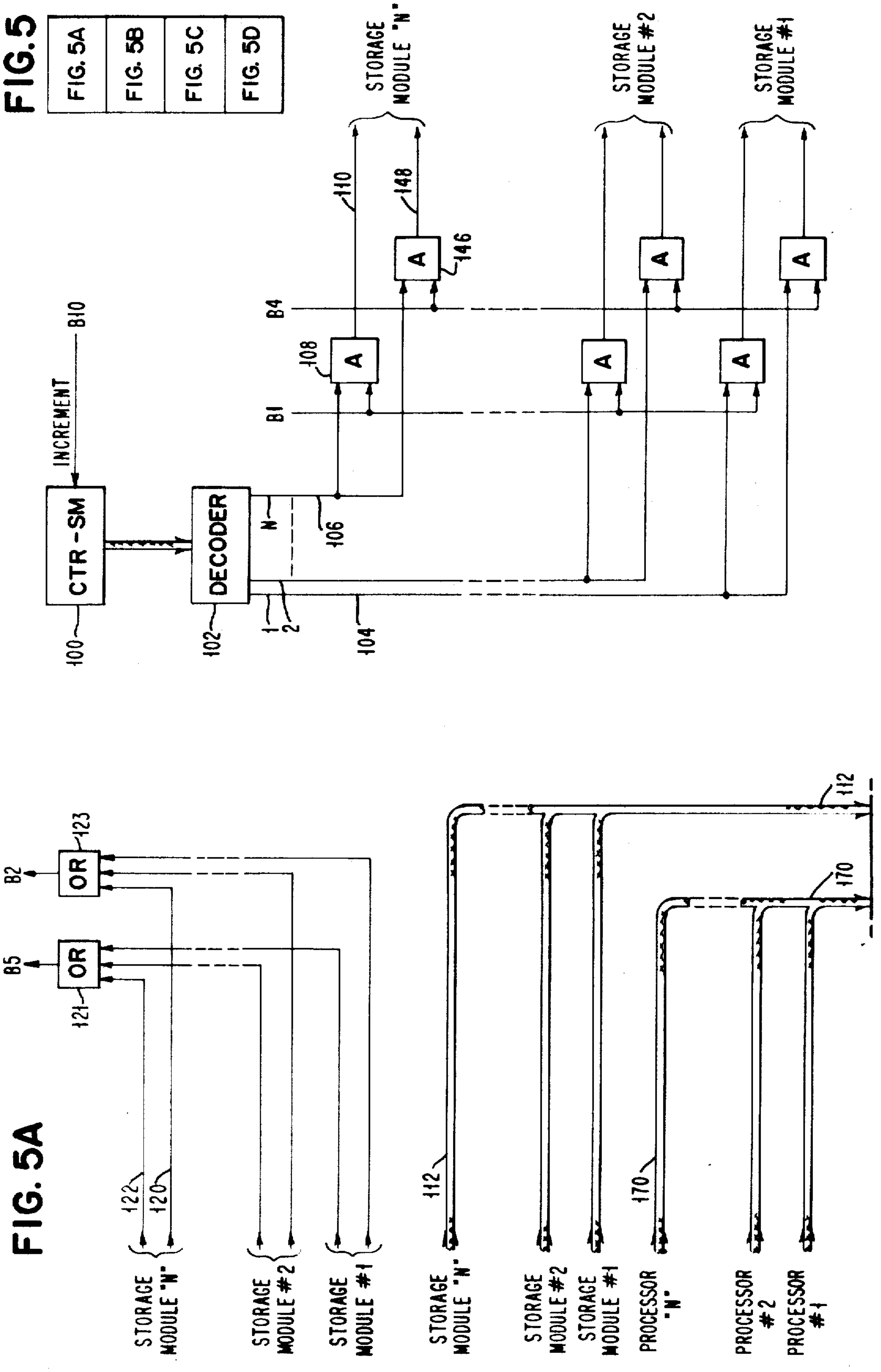

FIG. 5 is an organizational diagram for FIGS. 5A–5D.

Figure 1:
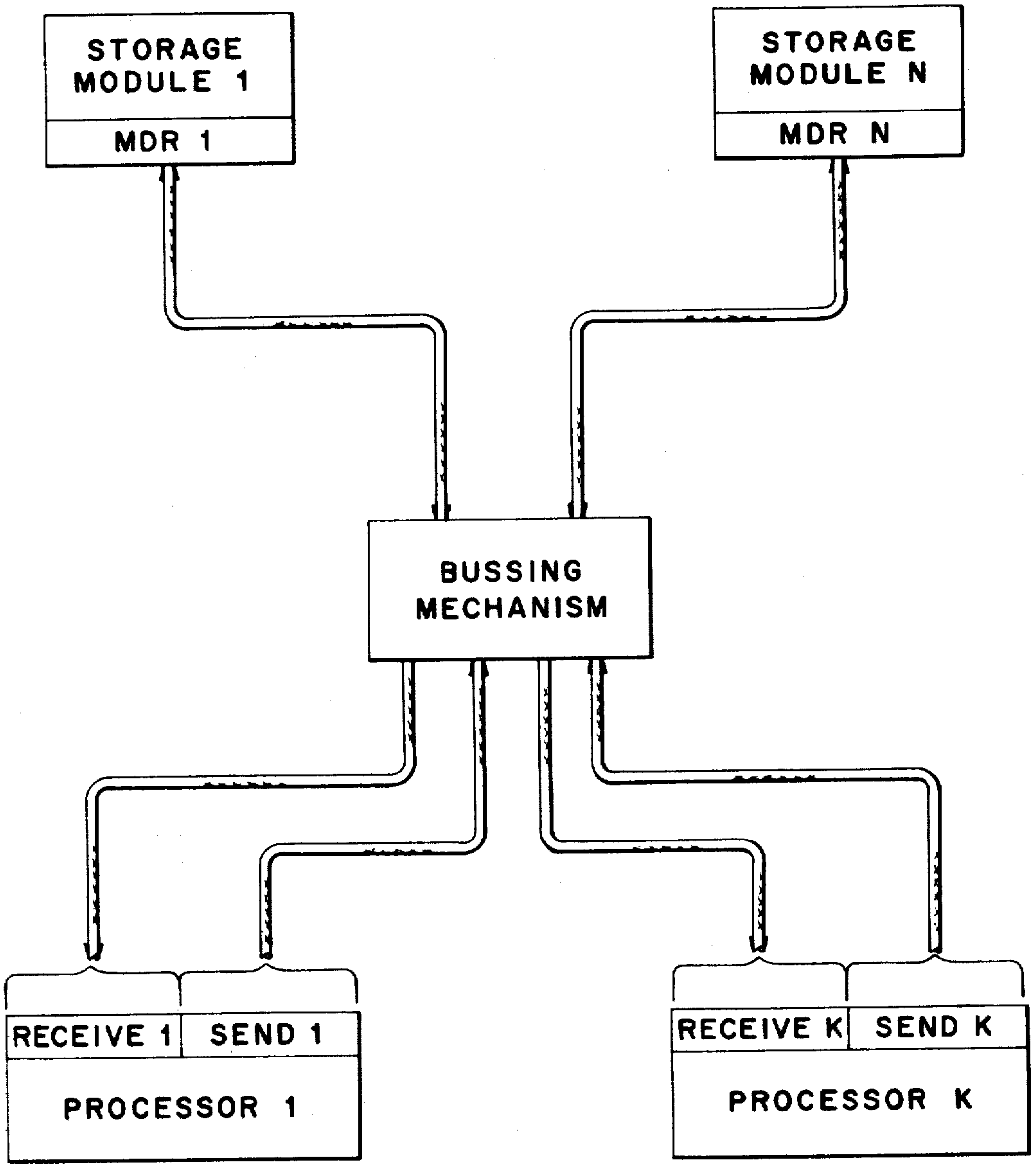
FIG. 1 is an overall functional block diagram of a multiprocessor system incorporating the teachings of the present invention.

FIGS. 5A–5D comprise a combination, logical and functional schematic diagram of the essential controls within the Bussing Mechanism as shown on FIG. 1.

Figures 6, 6A:
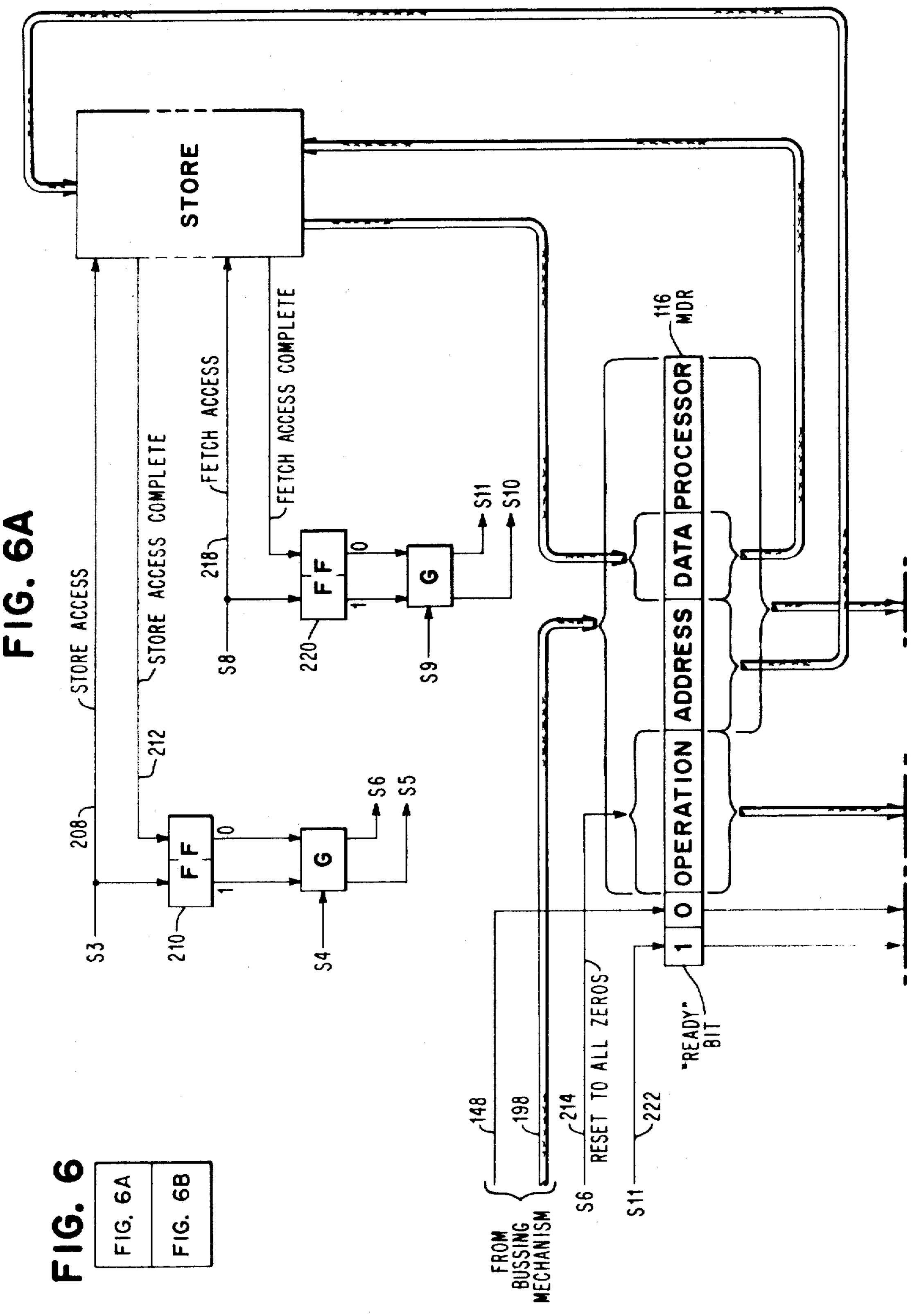
Figure 6B:
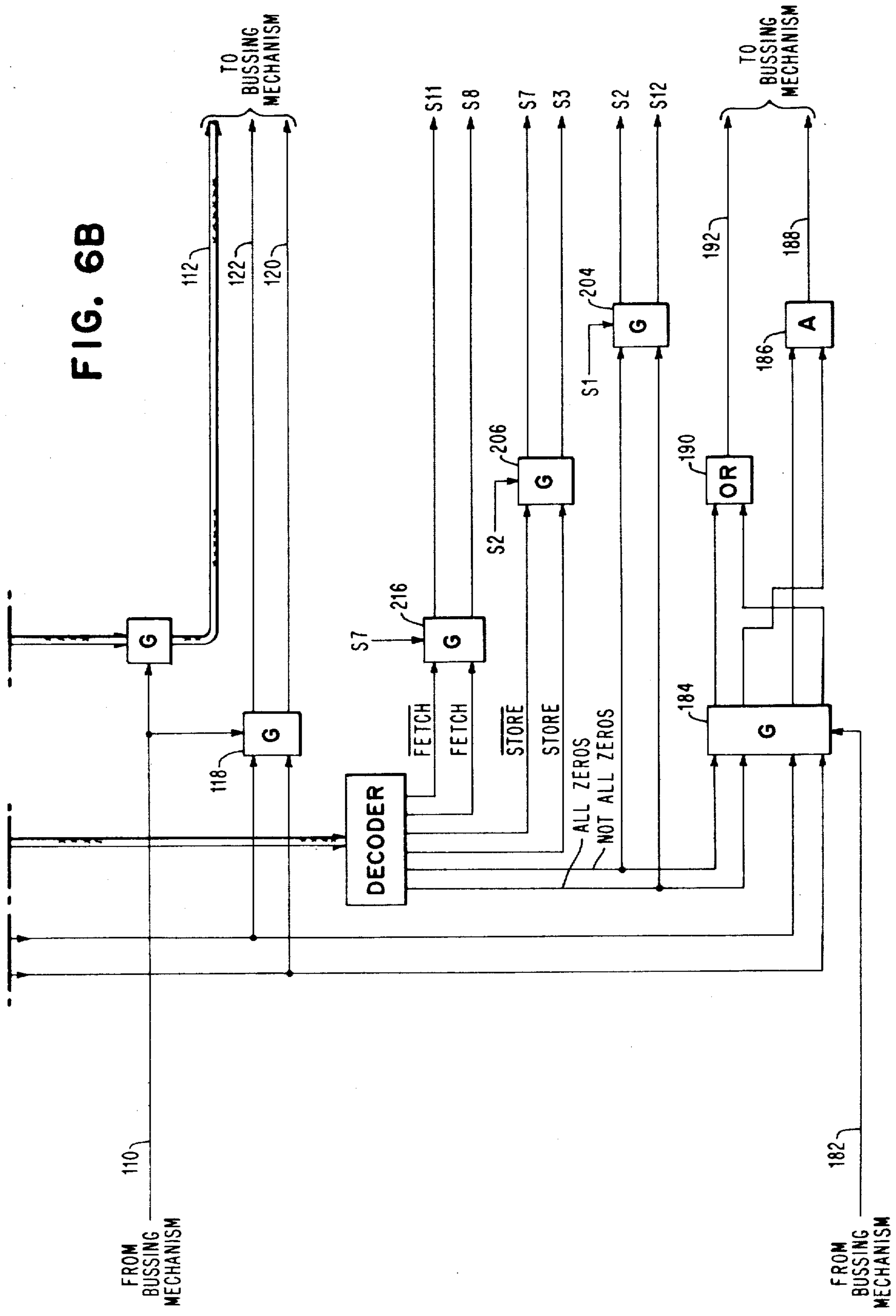

FIG. 6 comprises an organizational diagram for FIGS. 6A and 6B.

FIGS. 6A and 6B comprise a combination, functional and logical schematic diagram of the essential controls within one of the Storage Modules shown on FIG. 1.

Figures 7, 7A:
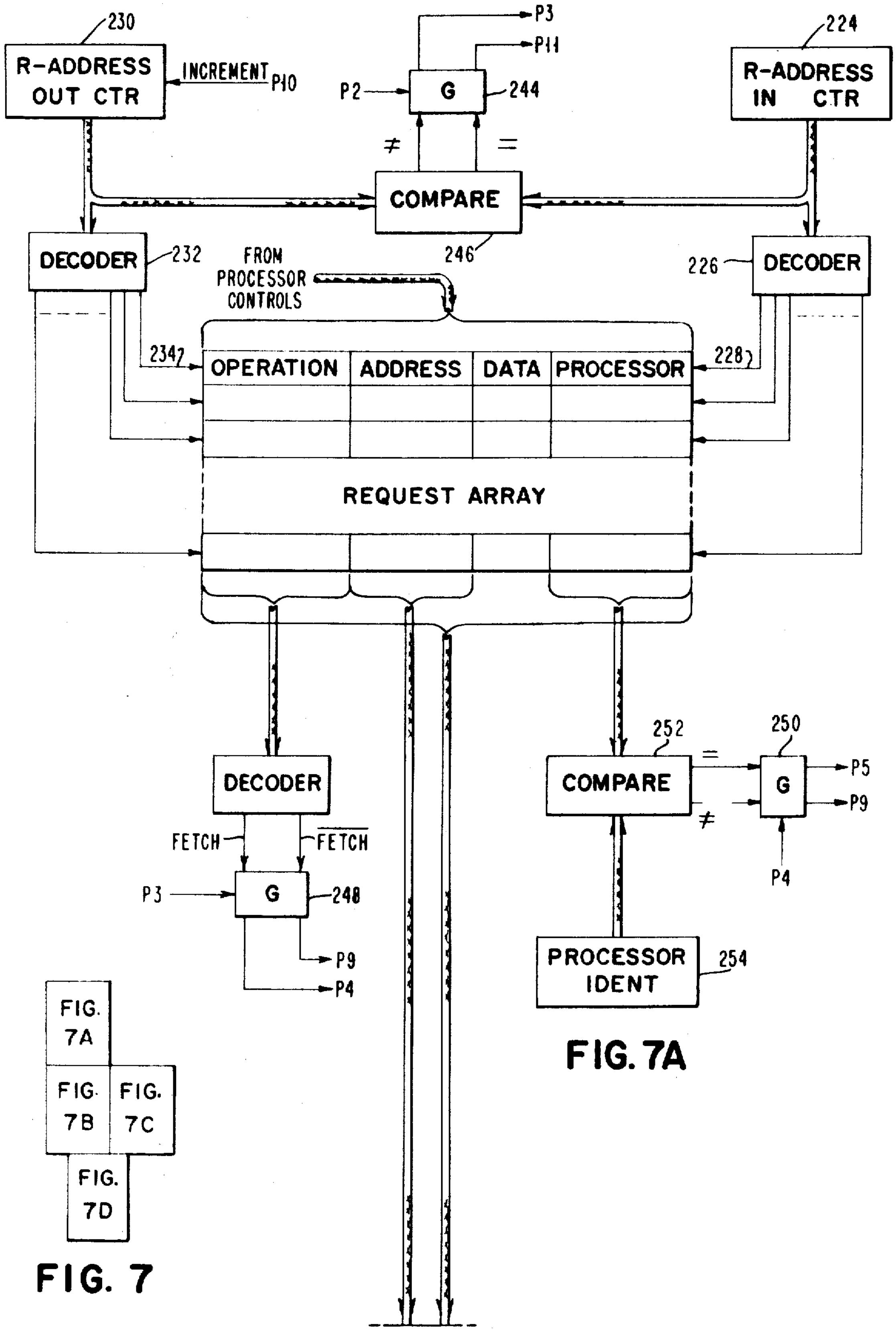

FIG. 7 comprises an organizational diagram for FIGS. 7A–7D.

FIGS. 7A–7D comprises a combination functional and logical schematic diagram of the essential controls within one of the Processors shown on FIG. 1.

Figure 8:
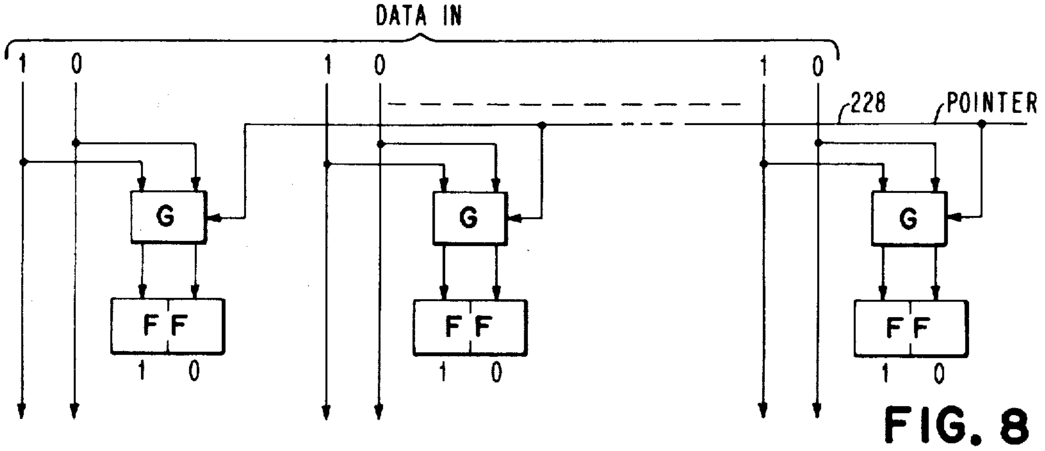

FIG. 8 is a logical schematic diagram illustrating how the "pointer" is used to read data into a selected register of the Request Array shown on FIG. 7A.

Figure 9:
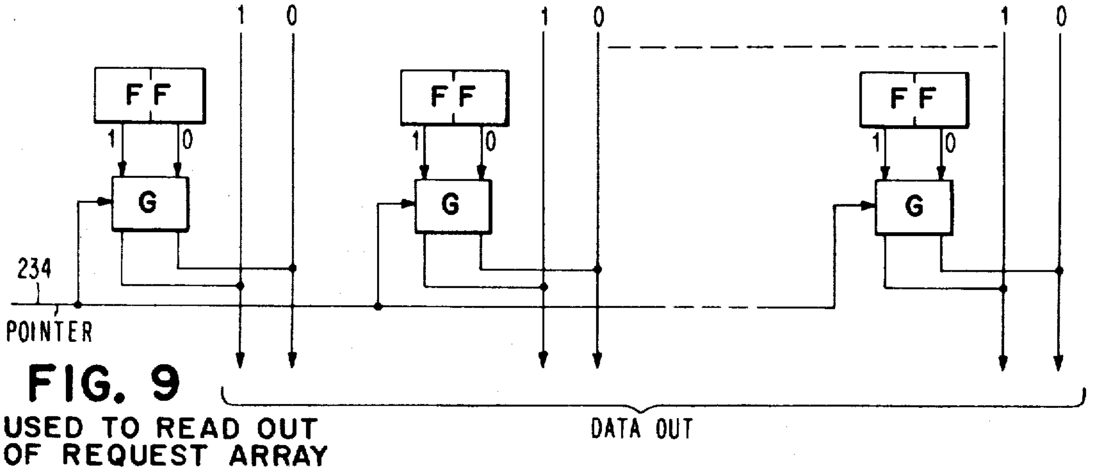

FIG. 9 is a logical schematic diagram illustrating how the "pointer" is used to read data out of the Request Array on FIG. 7A.

Figure 7B:
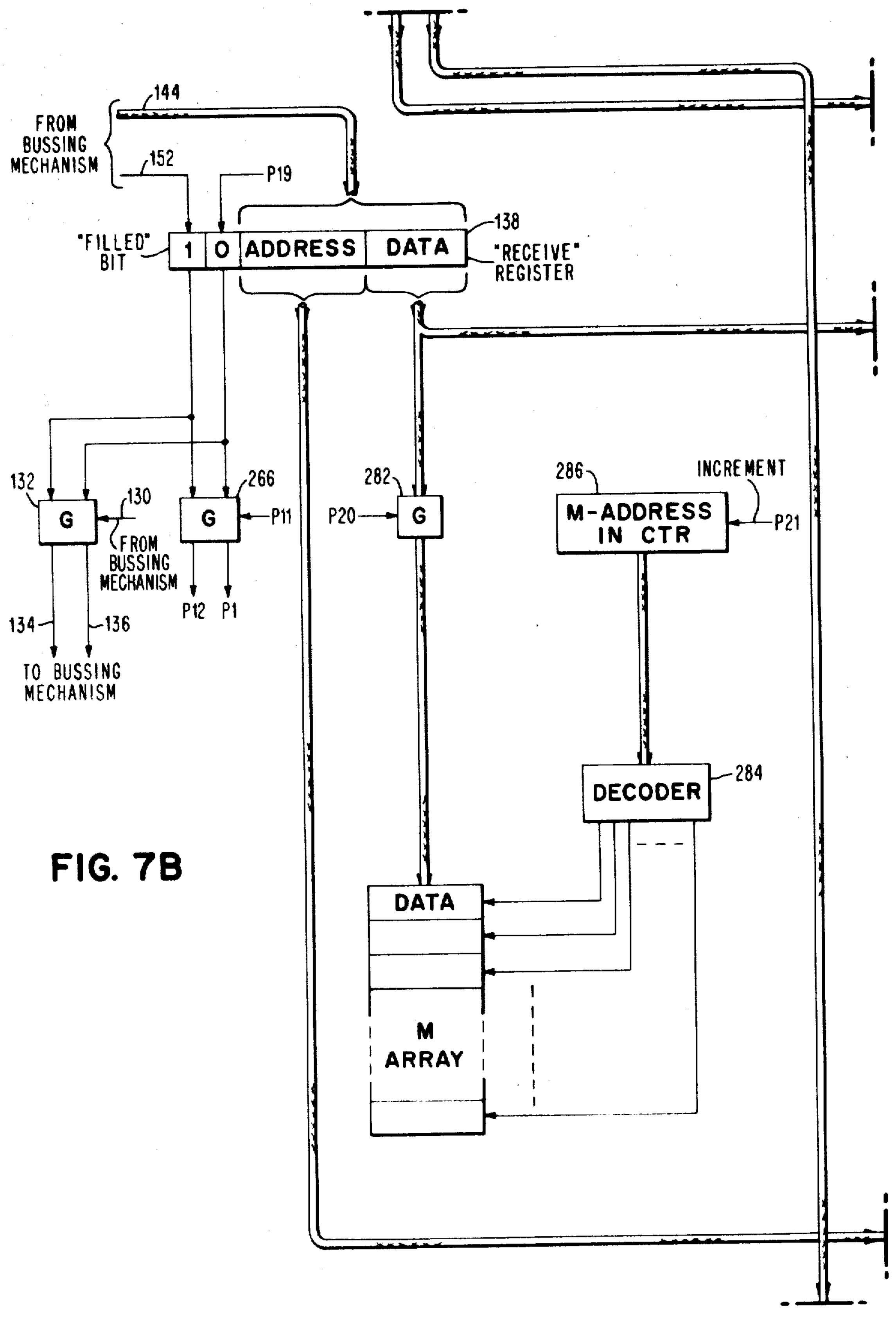
Figure 7C:
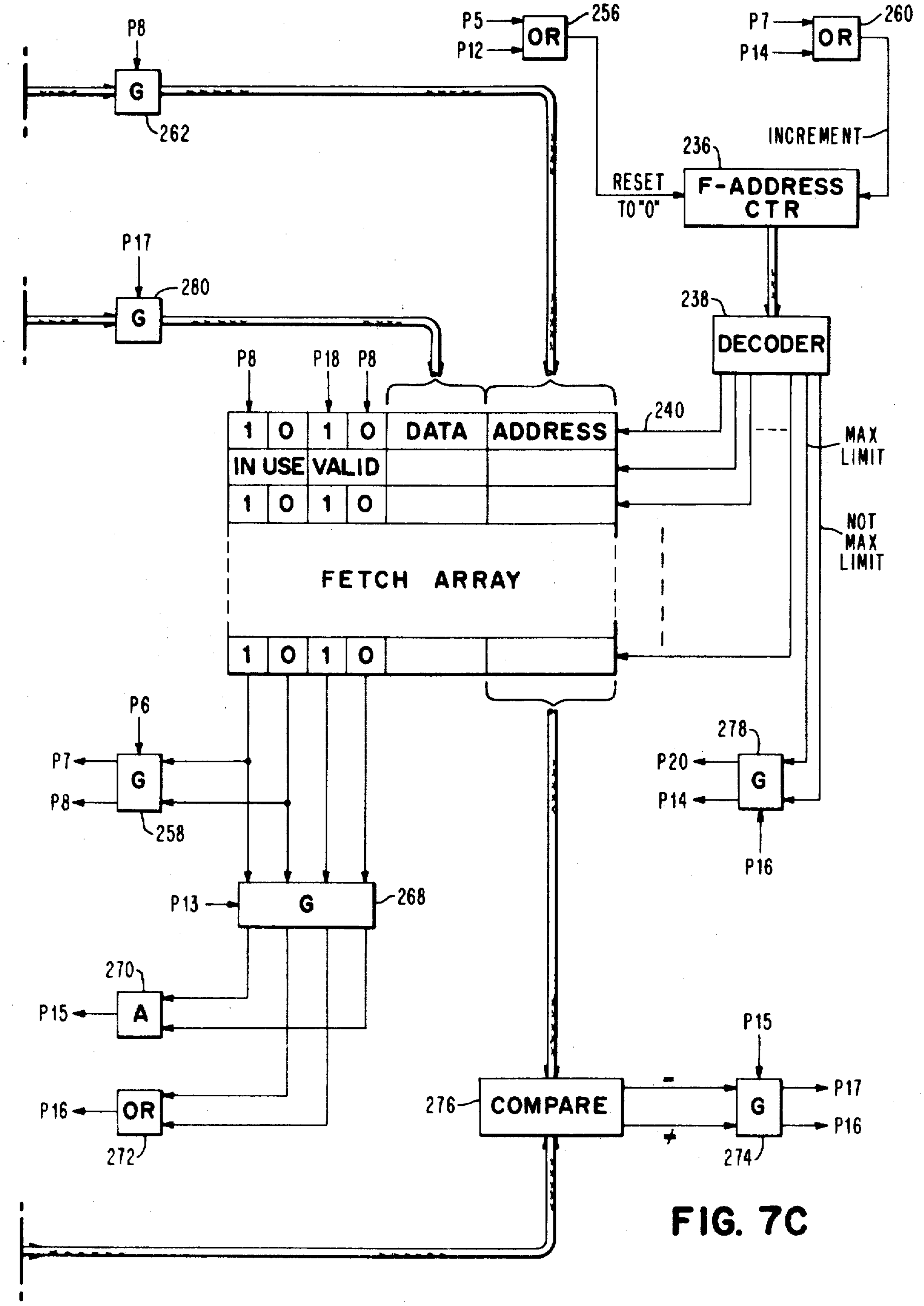
Figure 10:
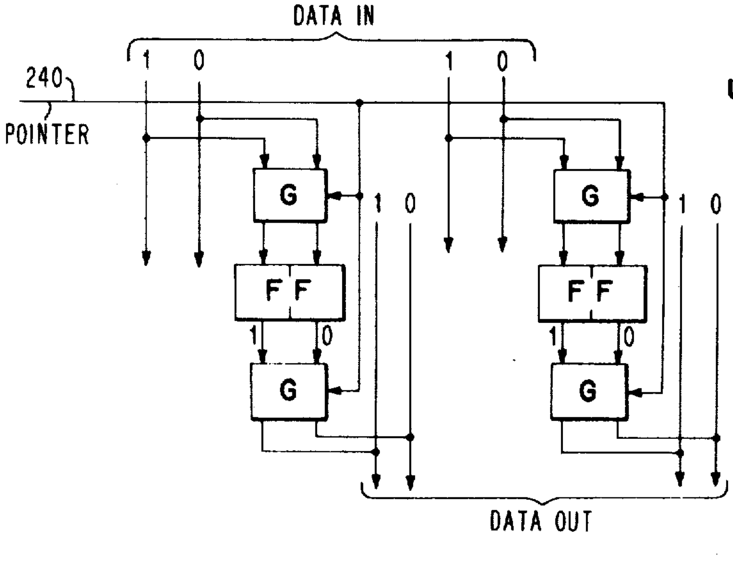

FIG. 10 is a logical schematic diagram illustrating how a "pointer" may be used to read data into and out of the Fetch Array on FIG. 7C.

DESCRIPTION OF THE PREFERRED EMBODIMENT

As stated previously, the present invention provides a method and means for one processor to deliver an unexpected message to another processor over an existing data bus within a multiprocessing system configuration. For purposes of the present embodiment, it is assumed that this system contains several processors and several Storage Modules to which each processor has direct access. When a processor has a message for another processor it sends the message to the data register of one of the Storage Modules from whence it is sent to the recipient processor. Alternatively, it may send a storage address to the Storage Module, which will then send the contents of the specified location to the recipient processor. Means are provided in the recipient processor so that upon receiving a word via the storage bus and recognizing that it has not requested the word, it will treat said word as a message to be acted upon at the end of the current instruction execution.

There are a number of different ways in which the system could be designed embodying the basic concepts of the present invention. It is believed that the present embodiment represents a good and straightforward design capable of accomplishing the intended results.

Referring to FIG. 1, the overall layout of the present multiprocessing system is shown. In the upper portion of the figure, the various Storage Modules 1–N are shown, each having its own Memory Data Register (MDR). Each of these modules is directly connected over an appropriate bus to the Bussing Mechanism which contains conventional controls for sequentially serving both processors and Storage Modules. As is stated subsequently, in the description of the Bussing Mechanism, for purposes of the present embodiment, it is considered that the Bussing Mechanism sequentially serves a Storage Module and then a Processor and then another Storage Module, etc. in a fixed sequence. This arrangement could easily be modified according to some desired service criteria which will be obvious to one skilled in the art. In any event a timing and servicing mechanism for such a Bussing Mechanism is well known and is not set forth per se in the present specification. Only those controls are shown throughout which are necessary to the present communication scheme.

A plurality of processors are likewise disclosed, each of which normally operates completely independently of the other processors until a request for a job to be done by another processor is encountered in the instruction sequence, at which point the present message transmitting system would take effect.

Proceeding to a more specific description of the operation of the present invention, it is assumed that the three possible operations involving a Processor, Bussing Mechanism and a Storage Module are a memory store instruction, a memory fetch request, or a message transmission operation. The last-named operation may either be a simple transmission or involve a memory access. Regardless of which of the three operations is to be performed, a given transmission of information or data between the various units of the system is approximately the same. The format of this data transmission is shown for example in the Local Register on FIG. 5B. It will be noted that four separate fields are present in this register. The first is the "Operation" field, which is coded to indicate whether a store, a fetch or a simple message transmission is taking place. The operation code for a transmission with memory access is the same as for a fetch, the distinction between these two operations lying in whether the processor identification (the contents of the "Processor" field) specifies the requesting processor or some other (recipient) processor. The second field is an "Address" field which indicates the actual address of the data in storage, which is to be stored or fetched. In the case of a simple message transmission, this "Address" field would be used only to specify the Storage Module through which the transmission is to take place and to indicate to the recipient processor that the data it receives is a message and not a response to a fetch request made by it. The "Data" field, as the name implies, is that portion of the information transmission which contains the actual data to be stored into memory or conversely represents a message to be transmitted between processors. Finally, the "Processor" field contains an identification of either the processor, which requested a memory access cycle on an ordinary fetch operation, or conversely is the receiving processor in the case of a message transmission operation (whether simple or involving a memory access).

The various control bits shown in the registers of FIGS. 5, 6 and 7 (i.e., the composite figures) are merely working bits utilized by the respective control circuitries of the various modules to test the condition of various operations and are not included in normal data transmission between the system components.

Before proceeding with the detailed description of the operation of the present system, a general description of the logical schematic diagrams, shown in FIGS. 5A–5D, 6A and 6B, and 7A–7D, will follow to generally describe the overall operation of the system. Referring first to FIGS. 5A–5D, the essential controls for the Bussing Mechanism are shown. On this figure, the primary functional elements are the Storage Module Counter (CTR–SM) and The Processor Counter (CTR–PR) and finally the Local Register. The Storage Module and Processor Counters merely control servicing of the various Storage Modules and Processors by the Bussing Mechanism and are illustrated in the present embodiment as merely taking turns servicing first a Storage Module and then a Processor. It will be noted that the counters are in essence closed loops. In other words, they count to the maximum number and revert back to a one count and renew their cycle. The Local Register receives an information transmission from either a Processor or a Storage Module, when either has information to transmit, and the information is stored in said Local Register. If the transmission came from a Storage Module, the "Processor" field is decoded and a determination is made as to which processor the information is to be subsequently transmitted to. If on the other hand the information transmission came from a Processor, the "Address" field is decoded to determine to which Storage Module the information is to be routed. The specific operation of the various gates and logic circuits will be descirbed subsequently.

Referring now to FIGS. 6A and 6B, the portion of the control circuitry of a Storage Module which relates to the present invention is shown. It will of course be understood that the basic memory module is completely conventional insofar as addressing circuitry, reading controls, writing controls, sensing controls, etc. are concerned. Only that portion of the controls necessary for implementation of the present invention which are nonconventional are shown in the present embodiment. The Memory Data Register (MDR) 116 is essentially conventional in nature. It will be noted that the "Operation" field passes through a Decoder where a determination is made of the particular operation stored therein. If it is determined that a fetch operation is in order, a read cycle of the memory will ensue. If it is determined that a store operation is in order, a write cycle of the memory will ensue. If it is determined that an operation is present which is neither a fetch nor a store operation, then it is obviously a message transmission and the data in the MDR will be transmitted directly to the Processor indicated by the "Processor" field. Again, the details of operation of the various other logical components of FIGS. 6A and 6B will be described subsequently.

Referring now to the Processor controls shown on FIG. 7A–7D, a Request Array is shown on FIG. 7A. As the actual processor develops memory requests during the performance of various operations, these are placed in the Request Array under control of the R-Address In and Out Counters 224 and 230. The operation of such a Request Array is quite conventional and the details are shown here only insofar as they apply to the present invention. It will be understood that any of the three general types of operations may be placed in the Request Array, that is, a fetch, a store or a message transmission. In the case of an ordinary fetch, the processor's own identification will be placed in the "Processor" field and in the case of a message transmission, the address or identification of the recipient processor will be placed in this field as generally described above. As each new request in the Request Array is served, it is transferred to the Send Register 172 shown on FIG. 7D. This is the register accessed by the Bussing Mechanism and utilized to transmit data from a Processor to a Storage Module regardless of the particular operation involved. The Receive Register 38 on FIG. 7B is utilized as the name would imply to receive data from a Storage Module via the Bussing Mechanism. It will be noted that in the Receive Register there is no "Operation" or "Processor" field as the controls no longer need this information. To determine whether or not the data appearing in the Receive Register is the result of a fetch request by the receiving processor, a compare is made between the address currently appearing in the "Address" field of the Receive Register against the addresses stored in the "Address" field in the Fetch Array Registers. This comparison is necessary in order that the data be placed in the proper position of the Fetch Array so that it may be appropriately returned to the Processor proper in its correct sequence. In the event of a no compare on the "Address" field, the processor controls then recognize that the data appearing in the "Data" fields of the Receive Register is a message transmission from another processor and accordingly, the message is placed in the Message (M) Array shown on FIG. 7B.

The above general description of the principle functional components of the Bussing Mechanism, the Processor controls and the Storage Module controls will generally acquaint the reader with the operation of the present multiprocessor communication system. The specific details of the operation of these units in connection with the system clocks provided will follow subsequently.

Figure 2:
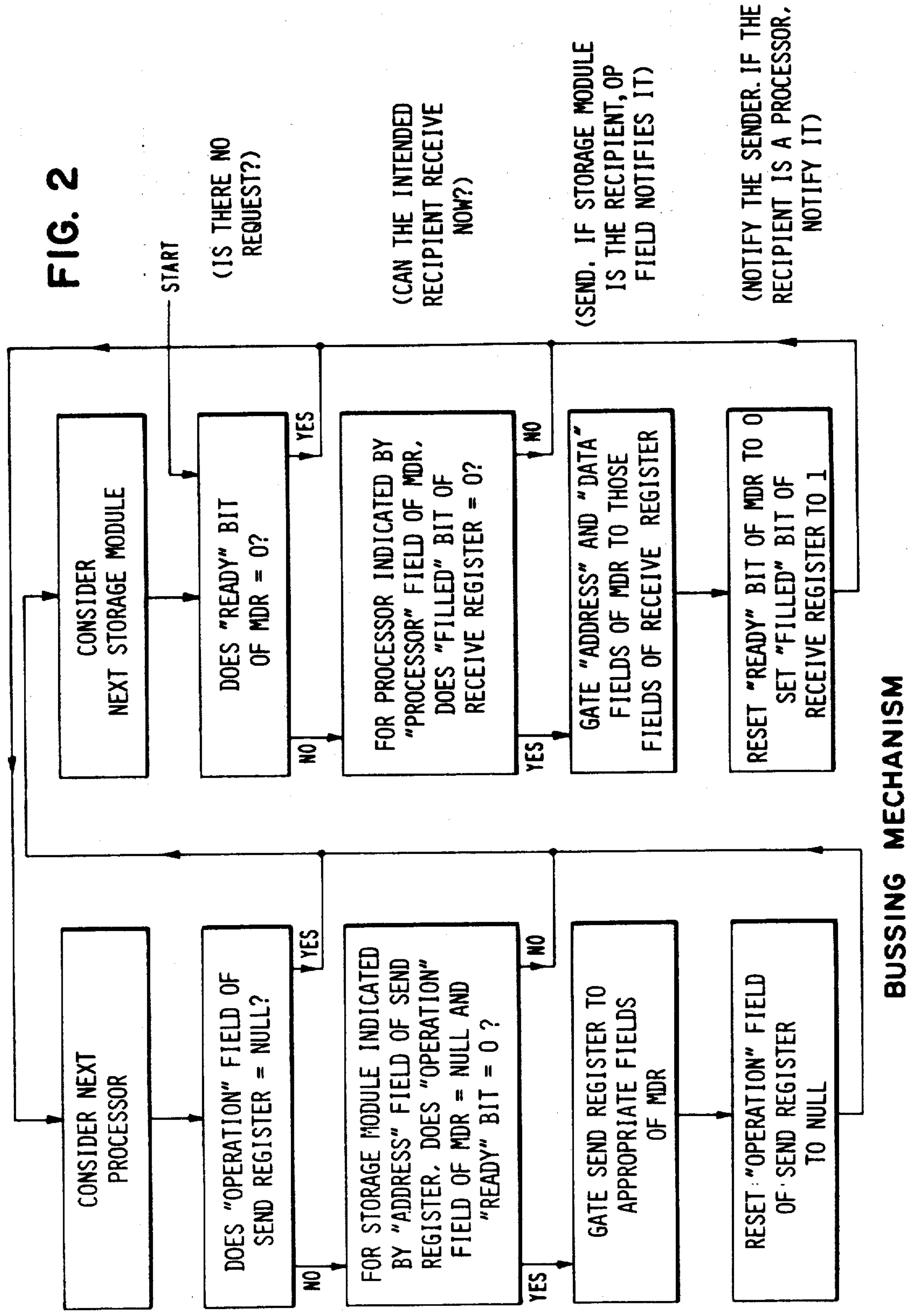
FIG. 2 is a flow chart illustrating the operation of the B-Clock which controls the functioning of the Bussing Mechanism.
Figure 3:
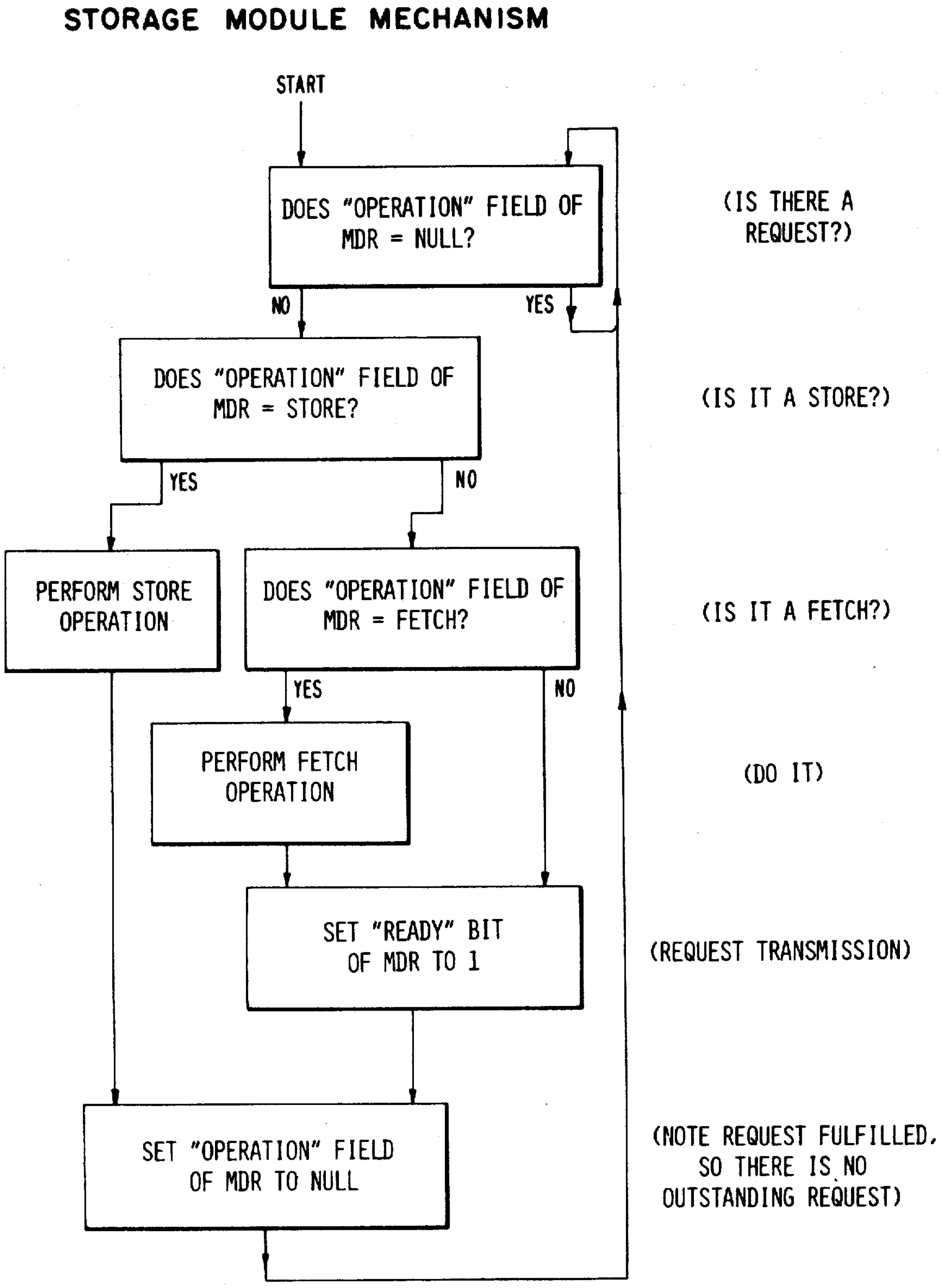
FIG. 3 is a flow chart illustrating the operations of the S-Clock which controls the sequence of events in the Storage Modules.

For a general functional description of the operation of the various units, reference may now be made to FIGS. 2, 3 and 4 (4A and 4B). These figures essentially represent flow charts of the operation of the various units and examination of the individual blocks shown on these figures indicates the specific test made within the circuitry at various stages of the individual clock sequences. The text material located at the right side of the various blocks illustrates the actual function being performed. Thus, for example, in FIG. 2, the second row of blocks functionally asks the processors or storage modules if they have a request during their particular service cycle by the Bussing Mechanism. The third row asks the intended recipient of the data transmission to the Bussing Mechanism whether it is in a position to receive the information to be transmitted. The fourth row designates the function of actually transmitting the information from the sender to the recipient and finally the fifth row relates to the function of resetting the controls of the sending unit to notify it that the operation has been completed.

The organization of FIGS. 3 and 4 is essentially identical to that of FIG. 2 and reference to the specific operation indicated within the actual blocks and the legends appearing directly to the right thereof in the margin are believed to be completely self explanatory. Accordingly, a specific description of these figures is superflous as an examination of same will clearly indicate the sequences of operations within the system. It should be noted that a reference to the Sequence Timing Charts appearing at the end of this section may be helpful to specify the particular clock steps during which the various operations shown in the flow charts occur.

It should be noted at this time that the specific clocks are not shown in the figures as they are completely conventional and would in essence comprise a series of timing blocks or stages having an input which initiates the timing stage wherein a first output pulse is produced when the clock stage turns on and a second output when the clock stage turns off. The turn-on pulse is normally utilized to initate the various control sequences specifically enumerated and shown in the logical schematic diagrams as indicated by the legends and the turn-off pulses may either be ignored or utilized to turn on the next clock stage in the sequence. The branching operations in the clock sequences are accomplished, such for example as shown in P-Clock. Referring to FIG. 7C it will be noted that an input to gate circuit 258 comes from timing stages P–6. Depending on the setting of the "In Use" bit, the occurrence of clock pulse P–6 will cause either clock sequence P–7 or P–8 to be initiated next. The application of all the enumerated timing pulses of the timing circuit is clearly shown on the figures and referred to the following detailed description of the disclosed embodiment.

Proceeding now with a specific description of the operation of the present multiprocessor communication system, the Bussing Mechanism will be described first. Reference may be made to FIG. 2 which is the flow chart for the Bussing Mechanism described previously, FIGS. 5A–5D which comprise the logical schematic diagram of the Bussing Mechanism and the Bussing Mechanism Clock portion of the Timing Sequence Charts for a better understanding of this description.

Referring to FIG. 5A, the Storage Module Counter 100 (CTR–SM) has its contents applied to the Decoder 102. The Counter 100 has a range equal to the number of Storage Modules. For example, if there were eight Storage Modules, the Conuter 100 would consist of three bits. It would start at zero and count up to seven and then revert back to zero. In the present embodiment, the "0" position of the Counter would cause line 104 to be active. When the Counter is on its maximum limit, line 106 would be active. The Counter 100 may be reset in the beginning to any desired number. If it be assumed that line 106 is active, at the time that the B–1 pulse is applied, AND circuit 108 will have an output on line 110. Line 110 extends to FIG. 6B of the Storage Module control circuits. On this figure, the line 110 is effective to gate the "Address," "Data," and "Processor" fields of the Memory Data Register 116 to cable 112. Cable 112 extends back to FIG. 5A and it may be seen that in this manner the three fields of the MDR Register 116 in the Storage Module are gated to the Local Register designated by the reference character 114 in the Bussing Mechanism.

Referring again to FIG. 6B, line 110 is also applied to gate 118 in order to test the left hand bit or "Ready" bit of Memory Data Register 116. If this bit is a "1," line 120 will become active. If this bit is a "0," line 122 will become active. Lines 120 and 122 extend to FIG. 5A, and are applied to OR circuits 121 and 123 to initiate the clock sequences B–2 or B–5. Thus, if the "Ready" bit is in its "1" state, clock sequence B–2 will be initiated and conversely if it is in its "0" state, clock sequence B–5 will be initiated.

Figure 5B:
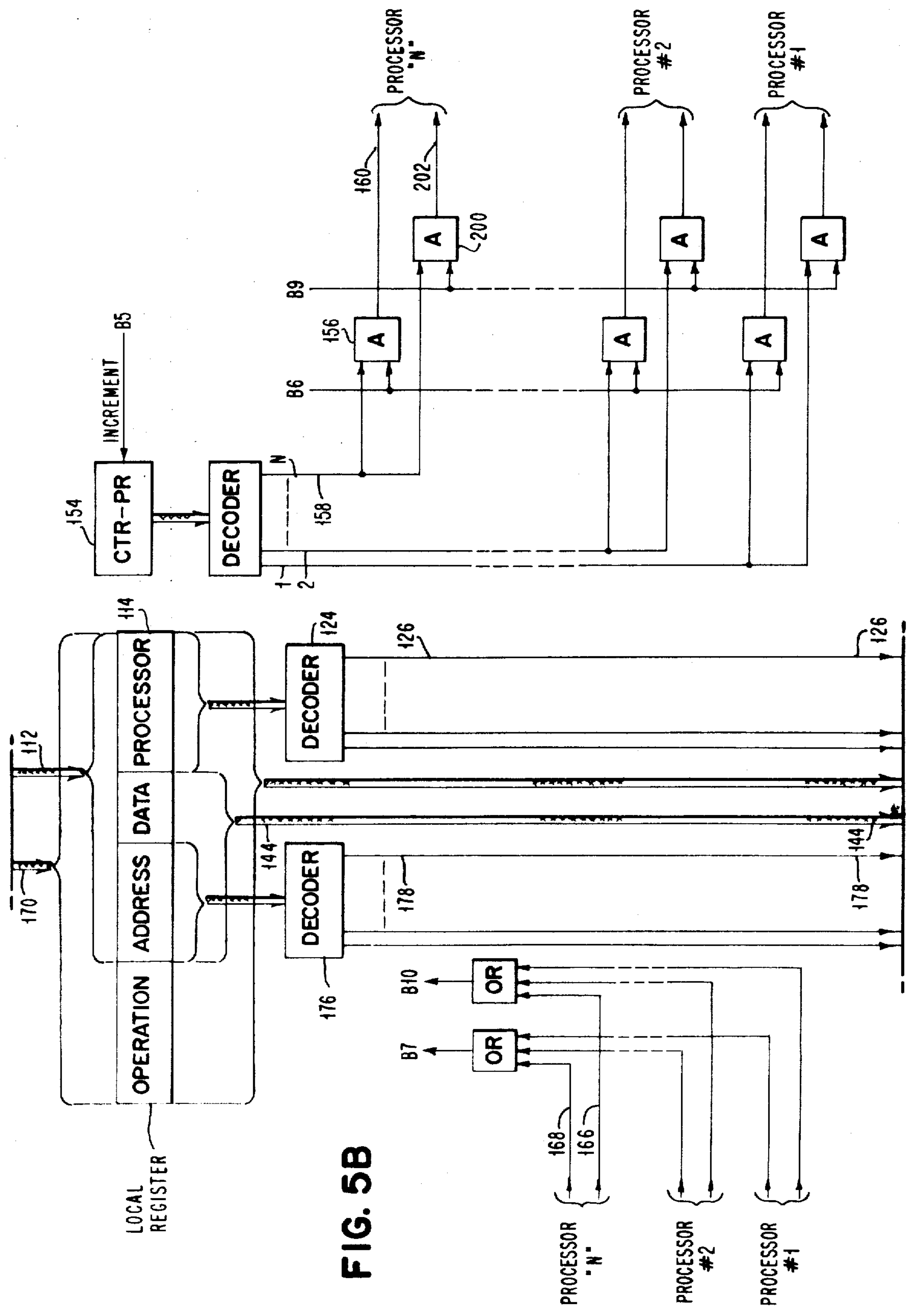
Figure 5C:
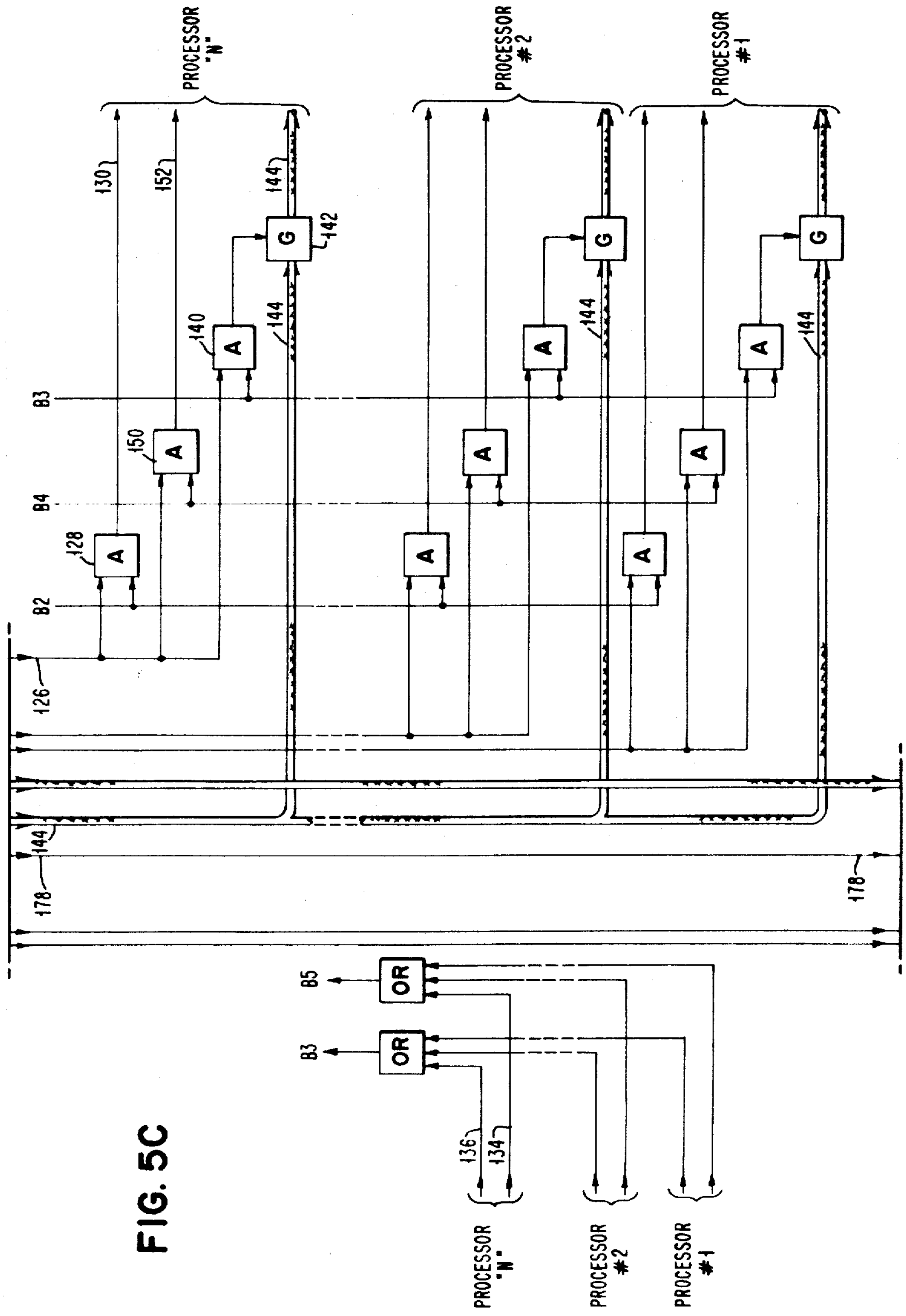

If it is assumed that the clock continues to clock sequence B–2, the following events will take place. Referring to FIG. 5B, the "Processor" field of the Local Register 114 is applied to the Decoder 124. One of the output lines of the Decoder 124 will be active. If it is assumed that line 126 emanating from the decoder is active at the time the B–2 pulse is applied to gate 128 on FIG. 5C, line 130 will become active. Line 130 extends to FIG. 7B where it is applied to gate 132 in order to test the left hand or "Filled" bit of the Receive Register 138, also on FIG. 7B. If this bit is a "1," line 134 will become active. If this bit is a "0," line 136 will become active. Lines 134 and 136 extend back to FIG. 5C. It may be seen that if line 136 is active, the clock will continue to B–3. If on the other hand, line 134 is active, the clock will branch to B–5.

If it is assumed that the clock continues to B–3, AND circuit 140 (FIG. 5C) will have an output to enable gate 142, which is effective to place the "Address" and the "Data" fields of Local Register 114 on cable 144. Cable 144 extends to FIG. 7B. In this manner, the "Address" and the "Data" fields of the Local Register 114 and the Bussing Mechanism are transferred to the "Address" and the "Data" fields of the Receive Register 138 in the Processor.

The clock next advances to B–4. The clock pulse B–4 is applied to AND circuit 146 on FIG. 5A in order to bring up line 148. Line 148 extends to FIG. 6A where it is effective to reset the left hand or "Ready" bit of the Memory Data Register 116 to "0." On FIG. 5C, the B–4 pulse is also applied to AND circuit 150 in order to bring up line 152. Line 152 extends to FIG. 7B where it is effective to set the left hand or "Filled" bit of Receive Register to "1."

The clock next advances to B–5 which on FIG. 5B is utilized to increment the Processor Counter (CTR–PR) 154. The clock next advances to B–6. If it be assumed that line 158 on FIG. 5B is active at the time that the B–6 pulse is applied to AND circuit 156, line 160 will become active. Line 160 extends to FIG. 7D where it is used to enable gate 162 in order to put the contents of the Send Register 172 on cable 170. Cable 170 extends to FIG. 5A. In this manner, the contents of the Send Register 172 of the Processor mechanism is gated to the Local Register 114 in the Bussing Mechanism. On FIG. 7D, the active state of the line 160 also extends to gate 164 which is used to test the output of the Decoder 174. If the "Operation" field of register 172 is all zeros, the line 166 will become active. If it is not all zeros, line 168 will become active. Lines 166 and 168 will extend to FIG. 5B. It may be seen that if line 168 is active, the clock will continue to B–7. If on the other hand line 166 is active, the clock will branch to B–10.

Assuming that the clock continues to B–7, on FIG. 5B, the Decoder 176 decides which Storage Module will be interrogated by the B–7 pulse. This is done, as will be well understood, by looking at certain bits of the "Address" field of the Local Register 114. If it is assumed that line 178 becomes active, still on FIG. 5B, AND circuit 180 will have an output on line 182 (FIG. 5B), when the B–7 pulse is applied. Line 182 extends to FIG. 6B (at bottom) where it is applied to gate 184 in order to test the left hand bit of the Memory Data Register 116. If the "Operation" field is all zeros and the "Ready" bit is "0," AND circuit 186 will have an output on line 188. If this condition is not true, OR circuit 190 will have an output on line 192. The lines 188 and 192 extend to FIG. 5D. If line 188 is active, the clock will continue to B–8. If on the other hand, line 192 is active, the clock will branch to B–10.

Figure 5D:
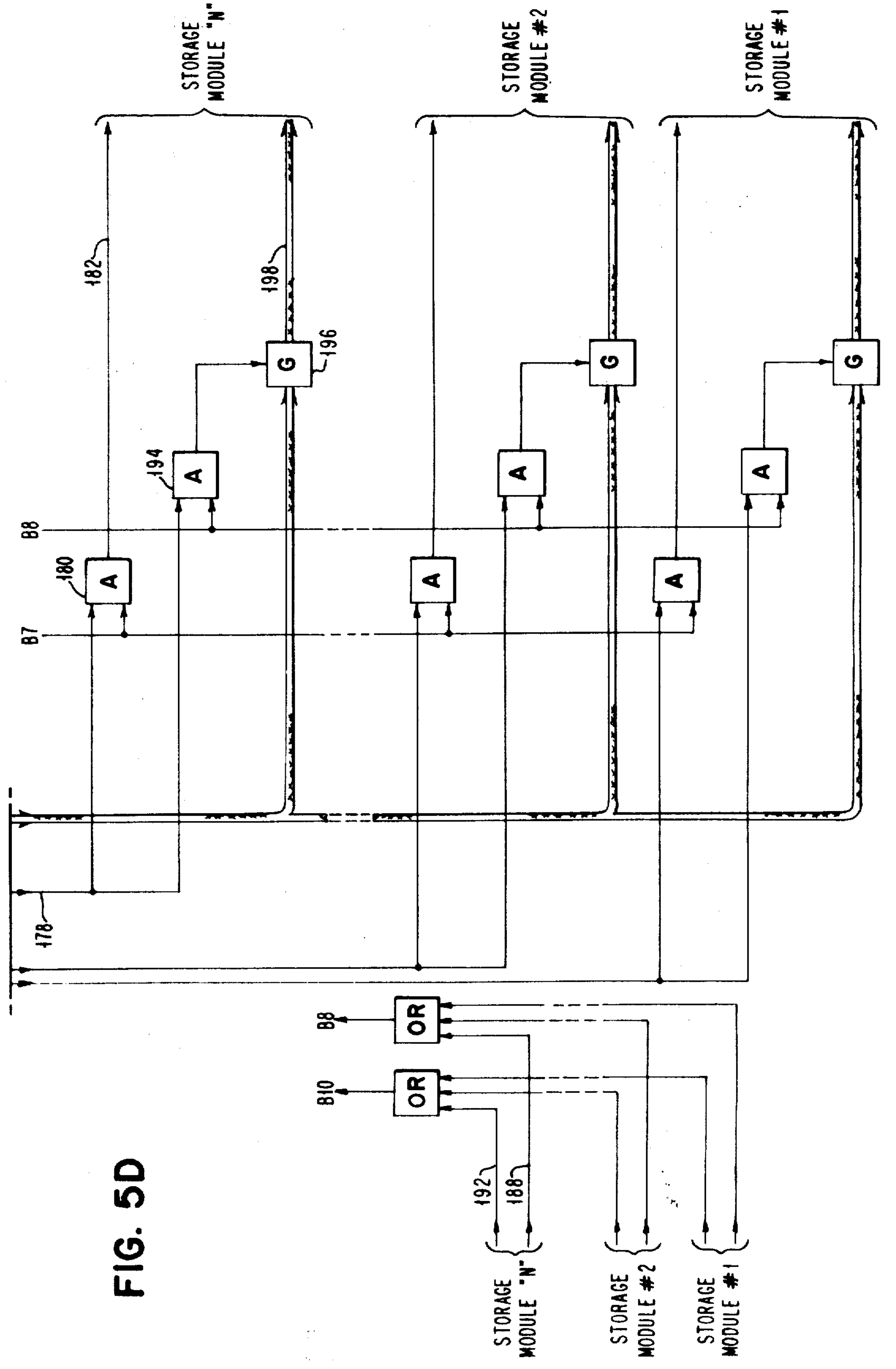

Assume that the clock continues to B–8. Referring to FIG. 5D, the clock pulse B–8 is applied to AND circuit 194 which has an output which enables gate 196. Gate 196 puts the entire contents of the Local Register 114 on FIG. 5B on the cable 198. Cable 198 extends to FIG. 6A. In this manner the contents of the Local Register 114 on FIG. 5B of the Bussing Mechanism are transferred to the Memory Data Register 116 of the Storage Module on FIG. 6A.

The clock next advances to B–9. On FIG. 5B the pulse B–9 is applied to AND circuit 200 in order to bring up line 202. Line 202 extends to FIG. 7B where it is utilized to reset the "Operation" field of the Send Register 172 to all "zeros."

The clock next advances to B–10 which is used to increment the Storage Module Counter 100 on FIG. 5A.

The Storage Module mechanism will next be described. Reference should be made to FIGS. 6A and 6B which comprises a logical schematic diagram of the control mechanism, the flow chart of FIG. 3 and that portion of the Timing Sequence Charts indicated as the S-Clock. On FIG. 6B, the S–1 pulse is applied to gate 204 in order to test the "Operation" field of the Memory Data Register 116. If this field is not all "zeros," the clock will continue to clock stage S–2. If this field is all "zeros," the clock will branch to S–12.

Assume first that the clock advances to S–2. This pulse is applied to gate 206 on FIG. 6B in order to test the "Operation" field of the Memory Data Register 116 to see whether or not it is a "Store" operation. If it is a "store" operation, the clock will continue to S–3. If it is not a "store" operation, the clock will branch to S–7. Assume first that the clock advances to S–3. On FIG. 6A, the pulse S–3 is applied to line 208 in order to effect a write access in the Memory per se indicated by the large block designated Store. It will be noted that at the same time, flip-flop 210 is set to its "1" state by the pulse S–3. The clock next advances to S–4 which is used on FIG. 6A to test flip-flop 210. If flip-flop 210 is in its "1" state, the clock will advance to S–5. If flip-flop 210 is in its "0" state, the clock will branch to S–6. It will be noted that when the store access is complete, a pulse will appear on line 212 (FIG. 6A) which will reset flip-flop 210 to its "0" state. The clock pulse S–5 is used for delay only and returns to clock S–4 which, as stated previously, tests the setting of flip-flop 210.

Assume that the clock has branched to S–6. On FIG. 6A, pulse S–6 is applied to line 214 to reset the "Operation" field of the Memory Data Register 116 to all "zeros." The clock sequence then proceeds to S–12.

Assume now that the clock sequence branched from S–2 to S–7. This stage is used to test the "Operation" field of Register 116. To do this on FIG. 6B, the S–7 pulse is applied to gate 216. If the operation is a "fetch," (note that the resulting data may or may not be destined for the requesting processor), the clock will advance to S–8. If the operation is not a "fetch," the clock will branch to S–11. Assume that the clock advances to S–8. On FIG. 6A, the pulse S–8 is applied to line 218 which initiates a read access in the actual memory (Store). At the same time flip-flop 220 is set to its "1" state.

The clock next advances to S–9 which is used to test flip-flop 220. If flip-flop 220 is on "1," the clock advances to S–10 which is used for delay only and returns the clock to S–9 to again test the flip-flop 220. When the "fetch" access is complete, flip-flop 220 is reset back to its "0" state and the clock will then branch to S–11.

The clock pulse S–11 on FIG. 6A is applied to line 222 which is used to set the left hand bit of the Memory Data Register 116 to its "1" state. The turn off of S–11 initiates S–6. Stage S–12 is used for delay only and upon turn off returns the Storage Module Mechanism back to step S–1.

Next the Processor mechanism will be described going through the sequences of operation as presented in the Processor clock (P-Clock) of the Timing Sequence Charts. Reference should also be made to FIGS. 4A and 4B for a description of the operations performed and primarily to FIGS. 7A–7D for the location and operation of the specific components of the circuit. In the Processor, there are three principal arrays of registers. The first of these is called the Request Array on FIG. 7A. Another is illustrated as the Fetch Array shown on FIG. 7C. The last of these arrays is shown on FIG. 7B and is illustrated as the M array. Each register in an array is composed of a series of storage flip-flops. Appropriate counters are utilized to select the registers which are to be read into and read out of. For example, the R-Address In Counter 224 on FIG. 7A provides an input to decoder 226. Only one line from the output of the decoder 226 can be active at any one time. A line that is active points to the register in the Request Array which can be read into. For example, if line 228 on FIG. 7A is active, it means that the top register in the array can be read into.

Referring briefly to the detail drawing, FIG. 8, this line or pointer 228 is shown. The pointer 228 enables the row of gates which connect the input lines (data in) to the inputs of the flip-flops of the register. In a similar way the R-Address Out Counter 230 and the Decoder 232 control the selection of the register in the Request Array from which information can be read. For example, if line 234 on FIG. 7A is active, it means that the uppermost register in the array can be accessed for read out. This is illustrated in greater detail in FIG. 9 wherein the line 234 shown as the pointer enables the row of gates which connect the outputs of the actual storage flip-flops in the registers to the Data Out Lines. On FIG. 7C, the Fetch Address Counter 236 and its associated decoder 238 control both the read in and read out of the Fetch Array. This is illustrated in FIG. 10 where the line 240 is the pointer and enables gates which connect the inputs of the flip-flops to the Data-In lines. It will also be noted that the line 240 also enables the lower row of gates which connect the outputs of the flip-flops of the registers to the Data-Out lines.

Proceeding now with the specific operation of the Processor control mechanism, in FIG. 7B, the P–1 pulse is applied to gate 242 in order to test the "Operation" field of the Send Register 172. If this field is all "zeros," the clock will advance to P–2. If this field is not all "zeros", the clock will branch to P–11. Assume that the clock advances to P–2. Referring to FIG. 7A, pulse P–2 is applied to gate 244 in order to test the output of the Compare Unit 246. If counter 230 agrees with counter 224 there is nothing in the Request Array and therefore the clock can advance to P–11. If counter 230 does not agree with counter 224, the clock will advance to P–3. On FIG. 7A the P–3 pulse is applied to gate 248 in order to test the "Operation" field of the register in the Request Array which is pointed to by the decoder 232. If this operation is a "fetch", the clock will advance to P–4. If it is not a "fetch," the clock will branch to P–9.

On FIG. 7A, the P–4 pulse is applied to the gate 250 in order to test the output of the Compare Unit 252. The Compare Unit 252 compares the "Processor" field of the register pointed to by the Decoder 226 with the identification number of the Processor which is in the register 254. If these numbers agree, the clock will advance to P–5. If they do not agree, the clock will branch to P–9. It should be noted at this time that the processor identification number stored in register 254 is in essence the number or identification of the processor itself. If the output of the compare unit 252 is in agreement, it means in essence that the operation requested by the particular stage of the Request Array is a fetch and not a message transmission involving a memory access.

On FIG. 7C, pulse P–5 is applied to OR circuit 256 in order to reset the Counter 236 to a "0."

Referring now to FIG. 7C, the pulse P–6 is applied to gate 258 in order to test the "In Use" bit of the register in the Fetch Array which is pointed to by the output of the Decoder 238. If this bit is a "1," the clock will advance to P–7. If it is a "0," the clock will branch to P–8.

On FIG. 7C, the pulse P–7 is applied to OR circuit 260 in order to increment the counter 236. The clock then reverts back to P–6. On FIG. 7C, the P–8 pulse is applied to gate 262 in order to gate the "Address" field of the register in the Request Array, which is pointed to by the Decoder 232, to the register in the Fetch Array which is pointed to by the Decoder 238. It will be noted that the P–8 pulse is also used to set the "In Use" bit to "1," and to set the "Valid" bit to "0" in that register of the Fetch Array which is pointed to by the Decoder 238. This last operation in effect places the address of data requested by the Processor in the Fetch Array so that when the data is returned from the Storage Module the Processor will be able to recognize said data. In the event that the operation being requested was a message transmission, there would be no reason to store the memory address in the Fetch Array since the message would not be coming back to the sending processor, which is why the clock would branch directly from P–4 to P–9.

Figure 7D:
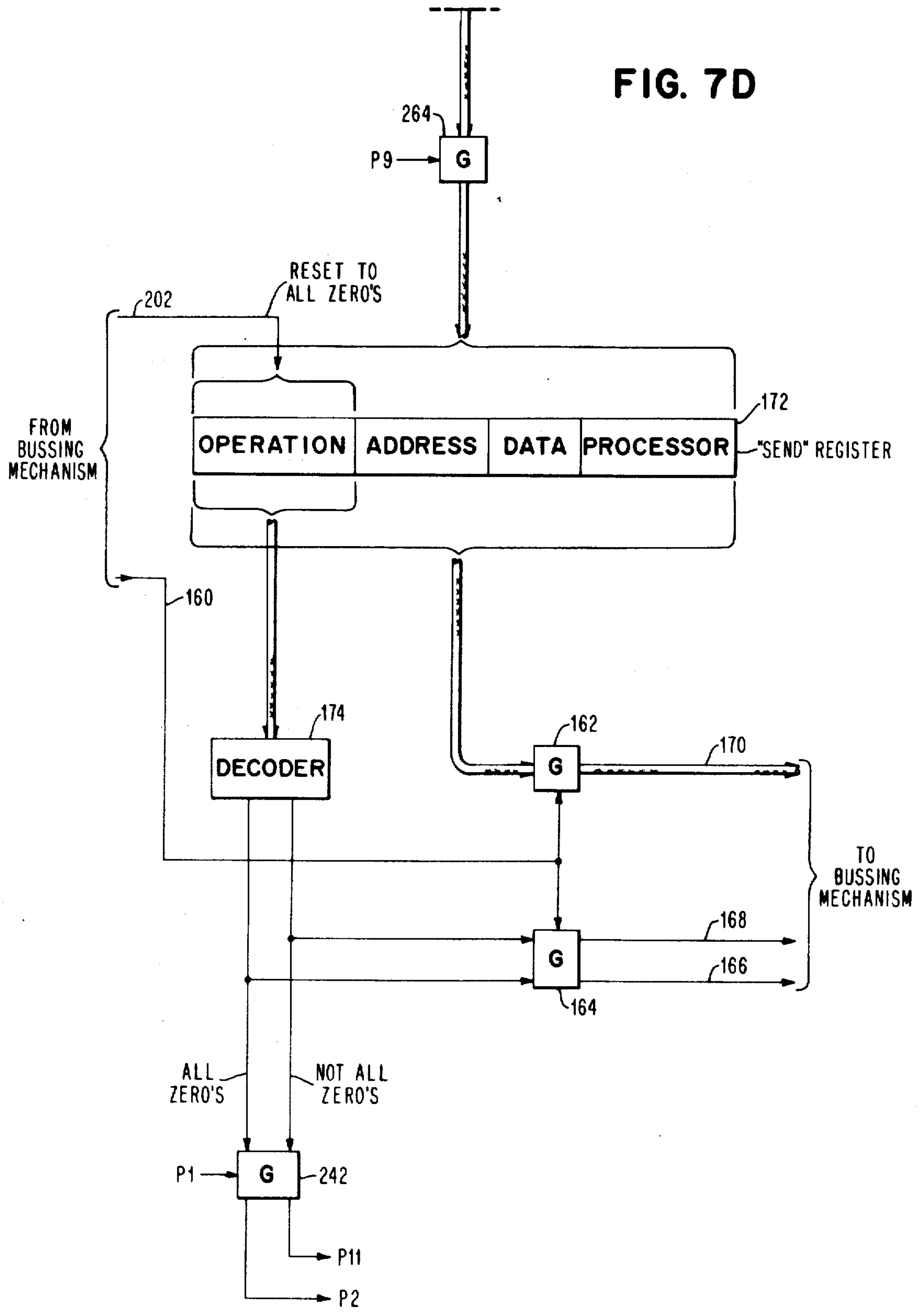

On FIG. 7D, the P–9 pulse is applied to gate 264 in order to gate the register in the Request Array which is pointed to by the decoder 232 to the register 172 indicated as the Send Register from whence an operation is transmitted to the Bussing Mechanism and then to a Storage Module.

The P–10 pulse is applied on FIG. 7A to increment the counter 230.

On FIG. 7D, the P–11 pulse is applied to gate 266 in order to test the left hand or "0" bit of the Receive Register 138. If this bit is a "1," the clock will advance to P–12. If this bit is a "0," the clock will revert back to P–1. On FIG. 7C, the P–12 pulse is applied to OR circuit 256 in order to reset the Counter 236 to "0."

On FIG. 7C, pulse P–13 is applied to the gate 268 in order to test the "In Use" and the "Valid" bits of the register in the Fetch Array which is pointed to by the Decoder 238. If the "In Use" bit is a "1," and the "Valid" bit is a "0," AND circuit 270 will have an output which will cause the clock to branch to P–15. If this condition is not met, OR circuit 272 will have an output which advances the clock to P–16.

On FIG. 7C, pulse P–14 is applied to OR circuit 260 to increment the counter 236; the clock then branches to P–13. On FIG. 7C, the pulse P–15 is applied to gate 274 which tests the output of the Compare Unit 276. If the output is unequal, the clock will proceed to P–16. If the output is equal, the clock will branch to P–17. Still on FIG. 7C, the pulse P–16 is applied to gate 278 to test if the Counter 236 is at its maximum limit. If the Counter is not at its maximum limit, the clock will branch to P–14. If the Counter is on its maximum limit, the clock will branch to stage P–20.

Still on FIG. 7C, clock pulse P–17 is applied to gate 280 to gate the "Data" field of the Receive Register 138 to the "Data" field of that register of the Fetch Array which is pointed by the Decoder 238. Clock pulse P–18 is used to set the "Valid" bit of that register of the Fetch Array which is pointed to by the decoder 238 to "1." On FIG. 7D, the clock pulse P–19 is utilized to reset the "Filled" bit of the Receive Register 138 to a "0." The clock then branches to P–1.

Pulse P–20 is applied to gate 282 to gate the "Data" field of the Receive Register 138 to that register in the M Array which is pointed to by the Decoder 284. The pulse P–21 is then used to increment the Counter 286 of the M Array. The turn off of P–21 reverts to P–19.

TIMING SEQUENCE CHARTS

Bussing Mechanism Clock (B Clock)

B–1.—Gate "Address," "Data" and "Processor" fields of MDR of Storage Module pointed to by current setting of Counter SM to Local Register. Test "Ready" bit of MDR of Storage Module pointed to by current setting of Counter SM. If on "1," →B–2; if on "0," →B–5.

B–2.—Test "Filled" bit of Receive Register of Processor pointed to by the "Processor" field of the Local Register. If on "1," →B–5; if on "0," →B–3.

B–3.—Gate "Address" and "Data" fields of Local Register to "Address" and "Data" fields of the Receive Register in the Processor pointed to by the "Processor" field of the Local Register; →B–4.

B–4.—Reset "Ready" bit of the MDR of Storage Module pointed to by current setting of Counter SM to "0." Set "Filled" bit of Receive Register of the Processor pointed to by "Processor" field of Local Register to "1." →B–5.

B–5.—Increment Counter PR; →B–6.

B–6.—Gate Send Register of Processor pointed to by current setting of Counter PR to Local Register. Test "Operation" field of Send Register of Processor pointed to by current setting of Counter PR. If all zeros, →B–10; if not all zeros, →B–7.

B–7.—Test "Operation" field and "Ready" bit of MDR of Storage Module pointed to by the "Address" field of Local Register. If "Operation" field is all zeros and "Ready" bit is zero, →B–8; if otherwise, →B–10.

B–8.—Gate Local Register to MDR of Storage Module pointed to by "Address" field of Local Register; →B–9.

B–9.—Reset "Operation" field of Send Register pointed to by current setting of Counter PR to all zeros; →B–10.

B–10.—Increment Counter SM; →B–1.

Storage Module Mechanism Clock (S Clock)

S–1.—Test "Operation" field of MDR. If all zeros, →S–12; if not all zeros, →S–2.

S–2.—Test "Operation" field of MDR. If "Store," →S–3; if "Not Store," →S–7.

S–3.—Effect store access (set F.F. 210 to "1"); →S–4.

S–4.—Is store access complete? (Test F.F. 210). If on "1," →S–5; if on "0," →S–6.

S–5.—Delay only, →S–4.

S–6.—Reset "Operation" field of MDR to all zeros; →S–12.

S–7.—Test "Operation" field of MDR. If "Fetch," →S–8; if "Not Fetch," →S–11.

S–8.—Effect fetch access (set F.F. 220 to "1"); →S–9.

S–9.—Is fetch access complete? (Test F.F. 220). If on "1," →S–10; if on "0," →S–11.

S–10.—Delay only; →S–9.

S–11.—Set "Ready" bit of MDR to "1," →S–6.

S–12.—Delay only, →S–1.

Processor Mechanism Clock (P Clock)

P–1.—Test "Operation" field of Send Register. If all zeros, →P–2; if not all zeros, →P–11.

P–2.—Test output of compare unit between R-Address In Counter and R-Address Out Counter. If =, →P–11; if ≠, →P–3.

P–3.—Test "Operation" field of Request Register pointed to by R-Address Out Counter. If "Fetch," →P–4; if "Not Fetch," →P–9.

P–4.—Test output of Compare Unit between "Processor" field of Request Register pointed to by the R-Address Out Counter and the Processor Identification Register. If =, →P–5; if ≠, →P–9.

P–5.—Reset F-Address Counter to "0";→P–6.

P–6.—Test "In Use" field of Fetch Register pointed to by F-Address Counter. If on "0," →P–8; if on "1," →P–7.

P–7.—Increment F-Address Counter; →P–6.

P–8.—Gate "Address" field of Request Register pointed to by R-Address Out Counter to "Address" field of Fetch Register pointed to by F-Address Counter. Set that "In Use" bit to "1"; set that "Valid" bit to "0"; →P–9.

P–9.—Gate the Request Register pointed to by the R-Address Out Counter to the Send Register; →P–10.

P–10.—Increment R-Address Out Counter, →P–11.

P–11.—Test "Filled" bit of Receive Register. If on "1," →P–12; if on "0," →P–1.

P–12.—Reset F-Address Counter to "0"; →P–13.

P–13.—Test "In Use" bit and "Valid" bit of Fetch Register pointed to by the F-Address Counter. If "In Use" bit is "1" and "Valid" bit is "0", →P–15, otherwise, →P–16.

P–14.—Increment F-Address Counter; →P–13.

P–15.—Test Compare Unit between "Address" field of Receive Register and "Address" field of Fetch Register pointed to by the F-Address Counter. If =, →P–17; if ≠, →P–16.

P–16.—Test F-Address Counter for MAX Limit. If on MAX Limit, →P–20; if not on MAX Limit, →P–14.

P–17.—Gate "Data" field of Receive Register to "Data" field of Fetch Register pointed to by F-Address Counter; →P–18.

P–18.—Set "Valid" bit of Fetch Register pointed to by F-Address Counter to "1"; →P–19.

P–19.—Reset "Filled" bit of Receive Register to "0"; →P–1.

P–20.—Gate "Data" field of Receive Register to Message Register pointed to by M-address In Counter; →P–21.

P–21.—Increment M-Address In Counter; →P–19.

CONCLUSIONS

The above description of the operation of the Processor mechanism completes the description of the operation of the present multiprocessor communication system. From the above description, it is believed that a person skilled in the art could readily modify an existing multiprocessor system having standard processor to data bus to storage module bussing and switching capabilities to achieve the processor-to-processor communication anticipated by the present invention. As stated previously, only that portion of the mechanism incidental to the present invention has been shown. For example, the functional details of a processor unit have obviously not been shown. It is assumed that the processor itself would fill the Request Array on FIG. 7A as memory requests or message transmission orders became necessary in its instruction sequence. An instruction calling for message transmission would indicate that path (i.e., the Storage Module to be used) in its "Address" field. Similarly, the details of the actual storage mechanism of the Storage Modules have not been shown. It is assumed that the actual store shown on FIG. 6A could be any random access read-write memory although a conventional core memory would in most probability be utilized for this purpose.

There are also many ways in which the receiving processor might be organized to respond to the message word. For example, it might act as if the word had been fetched in the course of the processing of an execute instruction, i.e., execute the word as an instruction but leave the instruction counter unchanged unless the word is a branch instruction, provided the bus width were as great as the length of the longest instruction or of the longest instruction allowed to be sent in this way. It might also treat the word as the "Address" field of an Execute Instruction or the immediate "Data" field of a Supervisor Call Instruction. It might also use part of the word to determine in which way the rest of the word should be treated, etc.

The exact manner in which the Storage Module and the Receiving Processor recognize that the word is a processor-processor message may vary depending upon the storage request and bussing structure of the particular system. In the present system, the "Operation" and "Address" fields served this purpose. If the system were simplified so that all message transmissions involved memory accesses, simple transmissions not being allowed, the Storage Module would never need to recognize that a message was being sent; as far as it was concerned, all operations would be either fetches or stores. It would not be difficult to extend the present system so as to have the Bussing Mechanism recognize the "Transmit" operation code, and send such a request to any currently free storage module, to avoid delays due to conflicting requests.

While the invention has been particularly shown and described with reference to a preferred embodiment thereof, it will be understood by those skilled in the art that various changes in form and details may be made therein without departing from the spirit and scope of the invention.

What is claimed is:

1. In a multiprocessor computer system including a plurality of processors and a central storage means wherein each processor is directly connectable to said storage means over a data bus means, and means associated with said data bus for selectively connecting a given processor to said storage means, the improvement which comprises:

means in each processor for specifying to the storage means that a store, fetch, or message transmission to another processor is to be performed by said storage means, means for providing the storage means with an indication of the recipient processor whenever a fetch or a message transmission order is given, means in the storage means for retaining the recipient indication information until said storage means is able to transmit the specified message information to the indicated recipient, means in each processor for recognizing when a piece of information appearing on the data bus from said storage means is directed to it, means in each processor for retaining such information when it is a designated recipient until it can be utilized, and means in each processor for distinguishing between data received as a result of a fetch request made by itself and message information from another processor.

2. A multiprocessor computing system as set forth in claim 1 wherein said last named means includes storage means for storing a characteristic identification of each fetch request made by said processor of said storage means, means operable upon receipt of information from said storage means to search for a match with said list of fetch requests, means operable upon an unsuccessful comparison to indicate that the received data is a message from another processor, and means for retaining said message until said processor can evaluate same.

3. A multiprocessor computing system as set forth in claim 2 including means in each processor for providing the message information for direct transmission through the storage means to a recipient processor.

4. A multiprocessor computing system as set forth in claim 2 including means in each processor for providing the address in the storage means of the message to be transmitted to the recipient processor.

5. A multiprocessor computing system as set forth in claim 2 wherein said storage means comprises a plurality of individual storage modules and said bussing means includes an individual multipurpose data transmitting bus connected to each processor and to each such storage module, said processors and storage modules being selectively interconnectable through a bussing mechanism control means, said bussing mechanism control means being responsive to connect a requesting system component to an indicated recipient.

6. A multiprocessor computing system as set forth in claim 5 wherein each processor includes means for indicating whether a message to a storage module is a store, fetch or simple message transmission instruction, said means including an appropriate data field transmission to said storage module, and means in each storage module for interpreting the data field and thus the operation to be performed by it.

7. A multiprocessor computing system as set forth in claim 6 wherein the recipient indication means transmitted by each processor to a storage module comprises an address which is either characteristic of the processor making the request in the case of an ordinary fetch operation or characteristic of the processor to receive the message in the case of a message transmission operation, and means in each storage module for temporarily holding data transmitted to it by a requesting processor when a simple message transmission is detected and for transmitting said data to the recipient processor without going through a memory access cycle.

8. A multiprocessor computing system as set forth in claim 7 wherein said bussing mechanism controls utilize the characteristic address supplied by a requesting processor to the storage module for fetch and message transmission operations to subsequently connect the storage module to the processor specified by said characteristic address.

References Cited

UNITED STATES PATENTS

| | | | |
|---|---|---|---|
| 3,242,467 | 3/1966 | Lamy | 340—172.5 |
| 3,312,951 | 4/1967 | Hertz | 340—172.5 |
| 3,401,380 | 9/1968 | Bell et al. | 340—172.5 |
| 3,440,616 | 4/1969 | Aranyi et al. | 340—172.5 |

GARETH D. SHAW, Primary Examiner